June 10, 1930.  J. J. CURELLO  1,762,328
RADIATOR SUPPORT
Filed Dec. 23, 1924   2 Sheets-Sheet 1
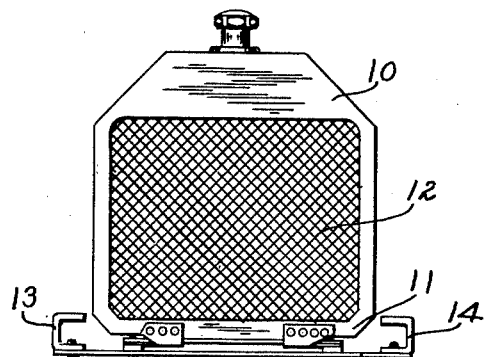
Fig. 1.
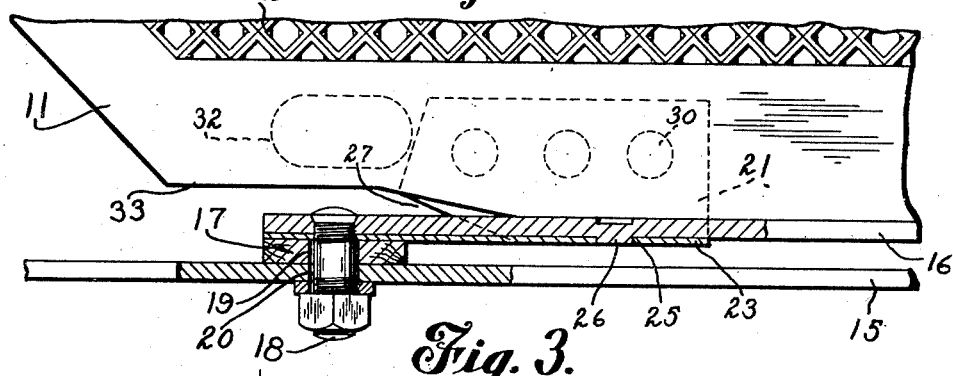
Fig. 2.
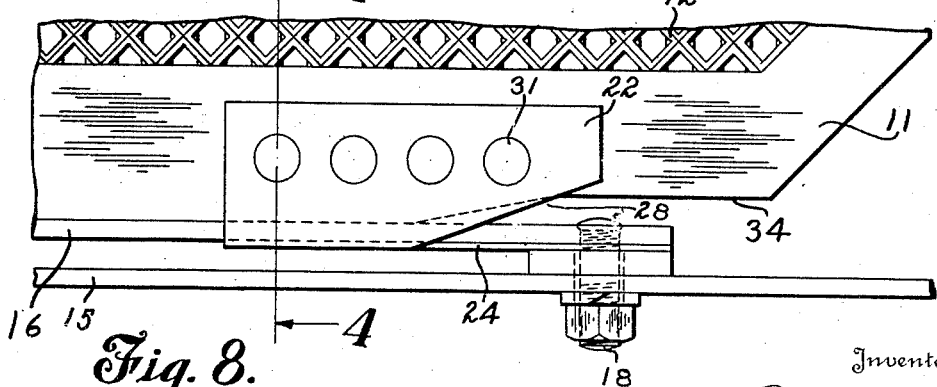
Fig. 3.
Fig. 8.
Inventor
John J. Curello
By Henry E. Rockwell
Attorney June 10, 1930.  J. J. CURELLO  1,762,328
RADIATOR SUPPORT
Filed Dec. 23, 1924  2 Sheets-Sheet 2

Inventor
John J. Curello
By Henry E. Rockwell
Attorney

Patented June 10, 1930

1,762,328

UNITED STATES PATENT OFFICE

JOHN J. CURELLO, OF NEW HAVEN, CONNECTICUT, ASSIGNOR TO THE G & O MANUFACTURING COMPANY, OF NEW HAVEN, CONNECTICUT

RADIATOR SUPPORT

Application filed December 23, 1924. Serial No. 757,679.

This invention relates to radiators for internal combustion engines, and more particularly to a novel means for supporting such a radiator upon the chassis or frame of a vehicle or the like in such a manner that the radiator will be relieved from the strain incident to road shocks or the like when the vehicle is in motion, and thus the danger of leaks developing in the tanks or cooling passages of the radiator from such shocks will be reduced to a minimum. At the same time I contemplate the provision of such a connection between the radiator proper and the frame of the vehicle that the radiator tanks will not have to be perforated or pierced, but on the contrary a strong and secure connection is made without such operations, and thus there is obviated the danger of radiator leaks developing about such perforations, as is very often the case when such openings are made as is usual with the methods of construction commonly employed.

One object of my invention is to provide a resilient or yielding support between the chassis of a vehicle and the radiator to lessen the shocks received by the latter due to vibrations and road shocks occurring in the chassis.

Another object of the invention is the provision of a spring or resilient support for supporting the radiator of a motor vehicle from the chassis so that the radiator will be permitted movement to some extent independently of the chassis, and thus be relieved to some extent from shocks occurring in the latter.

A still further object of my invention is the provision of the novel method of securing the radiator proper to the supporting member so that a firm connection is had, and at the same time no bolts or fastening members are passed through the tanks of the radiator around which leaks are apt to develop.

To these and other ends the invention consists in the novel features and combination of parts to be hereinafter described and claimed.

In the accompanying drawings:

Fig. 1 is a front elevational view of a radiator supported upon a vehicle chassis embodying my invention;

Fig. 2 is an enlarged detailed view partly in section of the support at one end of the radiator;

Fig. 3 is an enlarged detailed view of the support at the other end of the radiator;

Fig. 8 shows a modified form of supporting the cushioning member upon a vehicle chassis.

Figure 5:
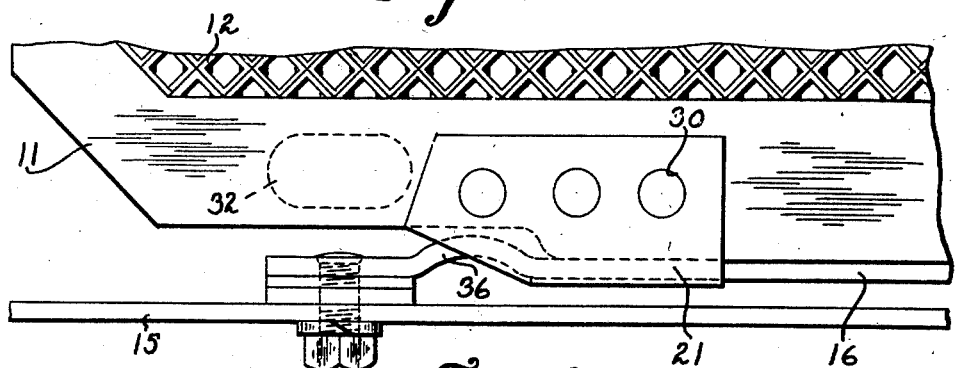
Fig. 5 is an enlarged detailed elevational view of one end of a radiator, showing a support of modified form.

In Fig. 1 of the drawings, I have shown an automobile radiator of conventional form comprising the upper and lower tanks 10 and 11 between which extend the cooling water passages 12. The chassis or frame of the motor vehicle upon which the radiator is adapted to be supported is represented by two longitudinal frame members 13 and 14 which in the form shown are channel shaped members, although their particular form is not important in connection with my invention. The longitudinal frame members of the chassis are generally connected by transverse frame members, one of which is shown at 15, and which are relatively rigid so that a rigid and secure connection between the longitudinal members is had, the cross or transverse members 15 possessing no resiliency whatever. It will be apparent that, if the radiator is secured directly or rigidly to this cross member or to the longitudinal chassis members, the radiator structure in which there are a large number of soldered joints will be subjected to all of the chassis shocks which are detrimental to the radiator structure and quite apt to cause leaks to develop therein.

I have determined that a radiator will give much better service if a resilient or cushioned support is provided for it, so that it may be permitted a certain amount of up and down movement independently of the chassis of the vehicle. As shown in Figs. 1 to 3 of the drawings, one means which I have employed for providing such a support consists of securing to the rigid transverse member 15 a radiator supporting saddle bar or member 16, which is of the proper thickness of metal to possess a certain amount of resiliency. This resilient or flexible saddle bar is spaced from the transverse member 15 by means of end blocks 17 so as to provide for up and down movements of the cushioned saddle bar member, the greatest of which movements will naturally take place at or about the central portion thereof. The member 16 is secured to the transverse member 15 adjacent its ends by means of the bolts 18 which pass through openings 19 and 20 in the members 17 and 15 respectively which are slightly larger than the bolts themselves. It will be apparent that when the member 16 moves upwardly or downwardly, due to shocks transmitted to it through the vehicle chassis, the length of this member will be somewhat altered, and the slight amount of play permitted between the bolts 18 and openings through which it passes will be sufficient to allow for these movements.

The lower surface of the tank 11 of the radiator normally rests upon the resilient saddle bar 16, and it is, of course, necessary to provide a fixed connection between the radiator and this member. It is also desirable, however, that the connection be made at spaced points, and also at points spaced from the bolts 18 so that the up and down movement of the members 16 will be freely permitted without danger of consequent damage to the radiator through strain transmitted thereto. To provide such a connection, I secure to the cross members 16 a pair of channel members 21 and 22 in such a manner that the bases 23 and 24 of these channel members lie below the member 16 and are provided with openings to receive the bolts 18, so that the bases 23 and 24 of the channel members will be secured by these bolts against displacement. As shown in Fig. 2, the base of each channel member may also be provided with an opening 25 into which is punched a boss 26 from the saddle bar 16 to provide an additional connection between these members.

The sides of the channel members 21 and 22 are designed to embrace the lower tank of the radiator, the lower corners of these sides adjacent the securing bolts being cut away, as shown at 27 and 28, so that the connection between the sides and the bases of the channel members will be at an appreciable distance from the securing bolts 18. It will be apparent that, if such an expedient is not resorted to, the connection between the transverse member 15 and the radiator through the bolts 18 and channel members would be too rigid to permit the desirable cushioning effect of my support.

The sides of the channel members 21 and 22 are provided with series of openings 30 and 31, through which solder may be flowed to solder the lower tank securely to the channel members so that the radiator will be fixed rigidly thereto. The sides of the channel member 21 are somewhat shorter than those of the channel member 22 in order to provide a clearance for the water outlet 32 located in the form shown at this side of the radiator. In order that the up and down movements of the saddle bar 16 will not be interfered with, the lower tank of the radiator is offset adjacent its ends, as shown at 33 and 34, so that the bottom of the tank at these points is spaced from the upper surface of the member 16. It will be apparent that at these points the saddle bar 16 is held rigidly against any movement in a vertical direction, and it is, therefore, essential to provide at these points a clearance space between these members and the radiator tank.

Figure 4:
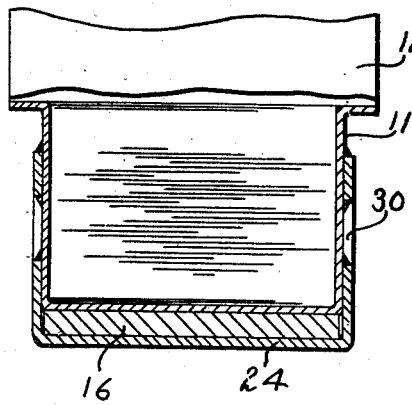
Fig. 4 is a sectional view on line 4—4 of Fig. 3.

As shown in the sectional view of Fig. 4, the resilient supporting saddle bar 16 lies between the bottom of the lower tank 11 of the radiator and the bottom piece 24 of the channel member. Throughout the greater part of the width of the radiator the bottom of the tank will rest mostly against the member 16, as shown in this figure.

If desired, the bottom of the radiator tank 11 may be constructed as a flat plane surface and the offsets 33 and 34 omitted, and in such case, clearance between the saddle bar 16 and the bottom surface of the tank may be provided at the ends by blocking up the tank from the saddle bar by means of two or more spacing members inserted between the bar and the bottom of the tank. Substantially the same result will be accomplished in this way, as provision will be made for vertical movements of the radiator with respect to that part of the saddle bar adjacent the bolts 18 and 20.

In the modification shown in Fig. 5, the cushioned saddle bar 16 is provided with offset or bent portions 36 and 37 which are designed to take up the changes in length of the member 16 which occur during its up and down movements, so as to permit a certain amount of elongation of the saddle bar under strain. In this instance, the bolts 18 may be fitted closely to the openings in the chassis member 15, and no play or movement allowed between the bolts and the chassis members. In this form of my invention the bottom portion of the channel member is shortened so that it does not extend outwardly to be secured by the bolts 18, the channel members being held in place by means of the perforations 39 into which are struck or punched the bosses 40 from the members 16. I may, if I desire, use the ordinary carriage bolts 41 provided with the squared upper ends 42 which are designed to be inserted through squared openings in the ends of the members 16, so that these bolts will not rotate after being put into place.

Figure 6:
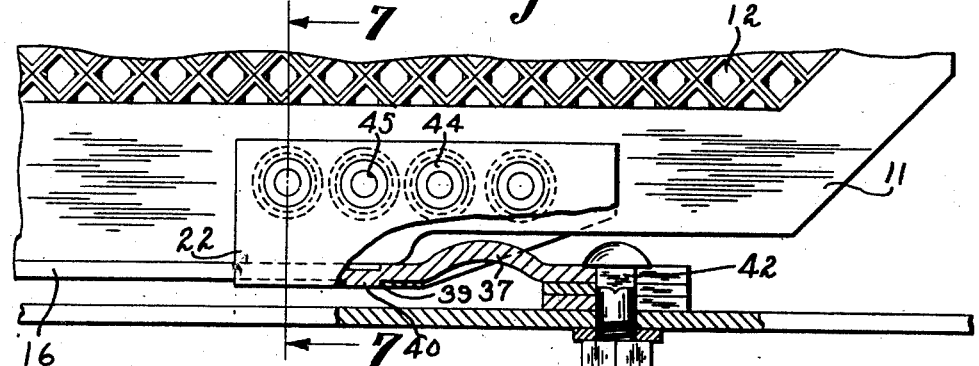
Fig. 6 is an enlarged detailed view partly in section showing the end of the radiator opposite that shown in Fig. 5.
Figure 7:
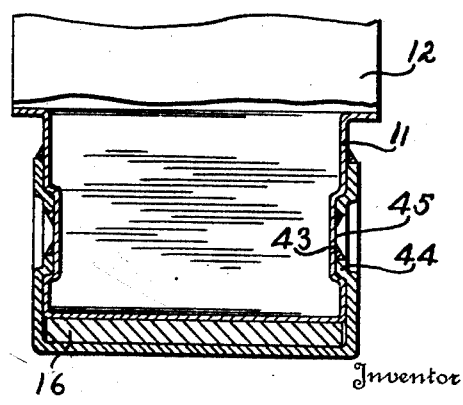
Fig. 7 is a sectional view on line 7—7 of Fig. 6.

As shown in Figs. 6 and 7, I may secure the channel members to the radiator tank by displacing the wall of the tank to provide a series of recesses 43 and punching out portions of the sides of the channel members to provide bosses or projections 44 to enter these recesses. The perforations 45 are provided within the bosses through which the solder may be flowed to make a secure soldered connection between the tank and channel members, as heretofore explained.

It will be apparent that, by supporting the radiator in the manner shown upon a resilient or cushioning supporting member instead of supporting it directly from the vehicle chassis, I provide a resilient or cushioned support for the radiator which will clearly lessen any shocks transmitted thereto, and by securing the radiator to the resilient member at spaced points and at points spaced from the fixed ends of this member the movements of the resilient member will have no harmful effect upon the radiator, but, on the other hand, the life of the latter will be clearly prolonged and its service improved.

In Fig. 8 of the drawings, I have shown a somewhat different method of mounting my resilient support upon a vehicle chassis. In this instance, the longitudinal frame members 46 and 46ª are connected by the rigid transverse member 47. Upon this member 47 are secured brackets 48 and 49, and the resilient supporting member 16 is in this instance secured upon these brackets in the same manner as upon the transverse member 15, as shown and described in connection with Figs. 1 to 7 of the drawings.

It will be understood, however, that the specific manner of mounting my improved support upon the chassis will depend to a large extent upon the make of automobile, as the chasses of various makes of cars differ to some extent in construction. The method shown in Fig. 8, for instance, is one which will be used with a considerable number of cars, while in some instances the method shown in Figs. 1 to 7 of the drawings will be employed.

While I have shown and described some preferred embodiments of my invention, it will be understood that it is not to be limited to all of the details shown, but is capable of modification and variation within the spirit of the invention and within the scope of the appended claims.

What I claim is:

1. Means for supporting a radiator on a vehicle frame, comprising a resilient member secured adjacent its ends to the frame and extending transversely thereof, means for securing said radiator to said member at points spaced apart and spaced from the ends of said resilient member, and means for permitting flexing of said resilient member under strain, the lower surface of the radiator resting on said resilient member for a portion of its length, but spaced thereabove at the end portions thereof.

2. In combination, a vehicle chassis, a resilient radiator supporting member extending transversely of the chassis in a substantially horizontal position and secured thereto at spaced points below the radiator, a radiator secured upon said supporting member with its lower portion resting thereupon at certain points, but spaced therefrom at said points of securement between the supporting member and the chassis.

3. In combination, a vehicle chassis, a resilient saddle bar secured adjacent its ends to said chassis and extending transversely thereof, means for supporting a radiator in a position resting upon said saddle bar comprising a channel member having its sides embracing the lower portion of the radiator, means for securing said channel member to the saddle bar at points spaced from the ends thereof, and means for permitting yielding movements of said saddle bar in a vertical direction independently of the chassis, the lower portion of the radiator being offset to be spaced above the saddle bar adjacent the points of securement of the latter to the chassis.

4. In combination, a vehicle chassis comprising longitudinal frame members, a rigid transverse member connecting said frame members, and means for supporting a radiator upon said transverse member comprising a resilient saddle bar disposed in spaced superposed relation to said member and having its ends movably secured thereto, and means for securing the radiator thereto.

5. In combination, a vehicle chassis comprising longitudinal frame members, a rigid transverse member connecting said frame members, and means for supporting a radiator upon said transverse member comprising a resilient saddle bar having its ends movably secured to said member and having its intermediate portion spaced therefrom to permit flexing of said member under strain, and means for securing a radiator to said member.

6. In combination, a vehicle chassis including a rigid transverse frame member, spacing blocks secured upon said member, a resilient radiator supporting member mounted upon said blocks in spaced relation to the frame member, means for securing a radiator upon said supporting member, and means to permit elongation of said member relative to its securing means under strain.

7. In combination, a vehicle chassis, a resilient radiator supporting member, means for securing said member to said chassis to permit movement thereof under strain, means for securing a radiator to said supporting member comprising channel members embracing said supporting member and the radiator, the lower portion of said channel members being secured to said supporting member and to the vehicle chassis and the sides thereof being secured to the radiator.

8. In combination, a vehicle chassis, a resilient radiator supporting members, means for securing said member to said chassis to permit movement thereof under strain, means for securing a radiator to said supporting member comprising channel members embracing said supporting member and the radiator, the lower portion of said channel members being secured to said supporting member at the under side thereof at points spaced from the ends thereof, and also being secured to the chassis.

9. In combination, a vehicle chassis, a resilient radiator supporting member secured at its ends thereto to permit movement of said member under strain, means for securing a radiator to said supporting member comprising channel members, the base portions of which rest flatwise against the supporting member and are secured thereto, and the sides of which are secured to the lower tank of the radiator, said channel members being spaced from each other and from the ends of the supporting member, and the sides of said channel member being disconnected from the base portion thereof for a part of their lengths, to permit flexing of the disconnected portion of the base with the supporting member.

10. In combination, a vehicle chassis, a resilient radiator supporting member, means to secure said member to said chassis to permit movement thereof under strain, a radiator secured to said supporting member with the lower tank thereof resting on the upper surface of said member, the lower surface of said tank being offset upwardly adjacent the ends of said supporting member so as to be disposed in spaced relation to the supporting member adjacent the ends thereof to allow for relative movement therebetween.

In witness whereof, I have hereunto set my hand this 17th day of December, 1924.

JOHN J. CURELLO.